United States Patent [19]

Fujiwara et al.

[11] Patent Number: 5,044,231
[45] Date of Patent: Sep. 3, 1991

[54] AUTOMATIC TRANSMISSION

[75] Inventors: Takuji Fujiwara; Kouzou Ishii, both of Hiroshima, Japan

[73] Assignee: Mazda Motor Corporation, Hiroshima, Japan

[21] Appl. No.: 613,055

[22] Filed: Nov. 15, 1990

[30] Foreign Application Priority Data

Nov. 15, 1989 [JP] Japan .................................. 1-296603
Dec. 19, 1989 [JP] Japan .................................. 1-330314

[51] Int. Cl.⁵ .............................................. B60K 41/10
[52] U.S. Cl. ........................................ 74/869; 74/866; 74/868
[58] Field of Search ................... 74/866, 867, 868, 869

[56] References Cited

U.S. PATENT DOCUMENTS

| | | | |
|---|---|---|---|
| 3,710,651 | 1/1973 | Marumo et al. | 74/866 X |
| 4,033,203 | 7/1977 | Hirosawa et al. | 74/869 |
| 4,065,985 | 1/1978 | Taga | 74/869 |
| 4,308,765 | 1/1982 | Iwanaga et al. | 74/869 |
| 4,534,244 | 8/1985 | Hiramatsu | 76/869 |
| 4,790,217 | 12/1988 | Kawano et al. | 74/868 |

Primary Examiner—Allan D. Herrmann
Assistant Examiner—William O. Trousdell
Attorney, Agent, or Firm—Fish & Richardson

[57] ABSTRACT

An automatic transmission includes transmission mechanism having a friction coupling member for enabling engine brake, and a hydraulic control circuit having a pressure regulator valve for feeding a coupling pressure to the friction coupling member and a cutback valve for reducing the coupling pressure. This automatic transmission further has a cutback valve control device for suspending the cutback in a particular gear ratio in the engine brake enable range. Accordingly, in the engine brake enable range which requires a higher coupling pressure, a sufficient coupling pressure can be assured by suspending the cutback.

5 Claims, 6 Drawing Sheets

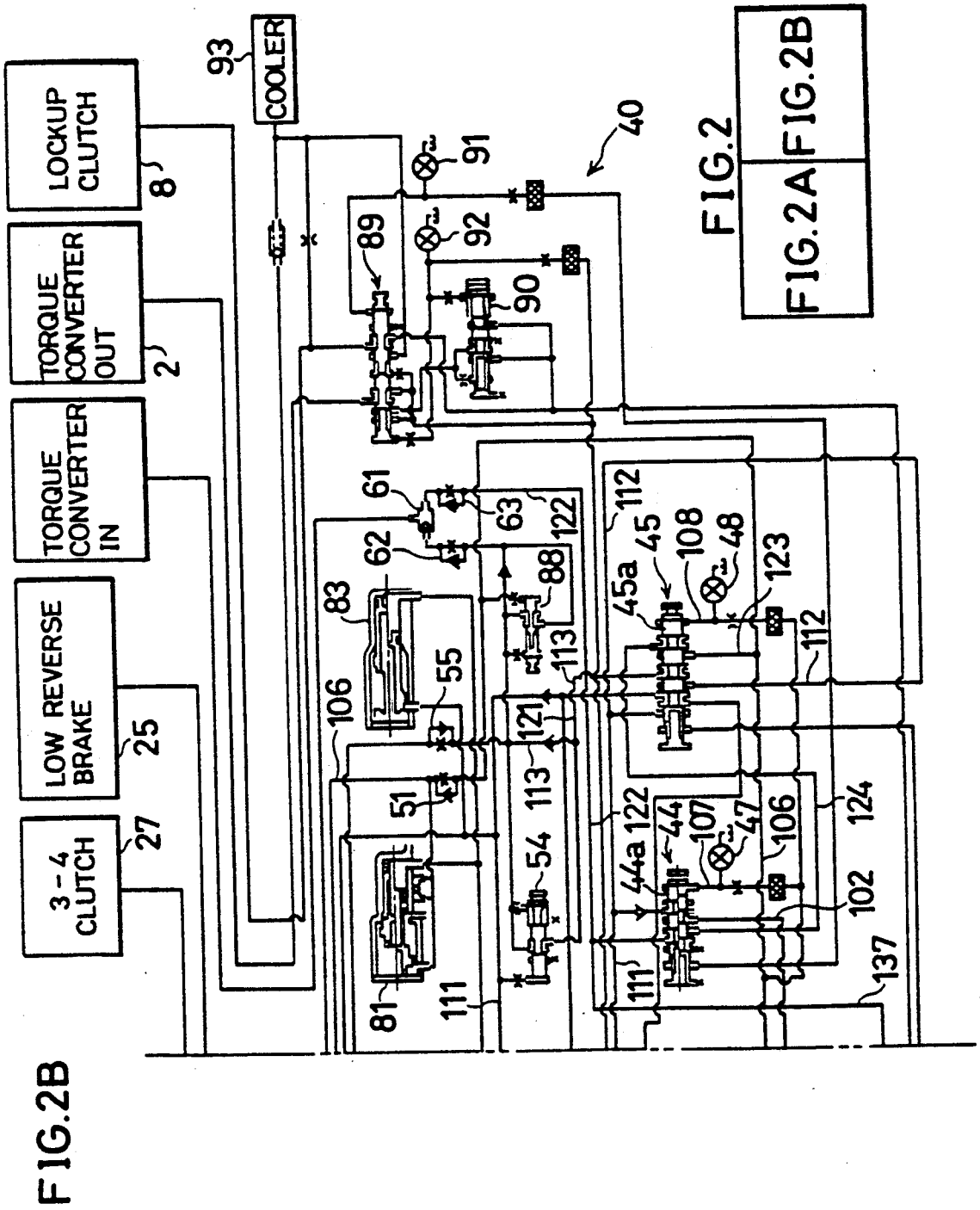

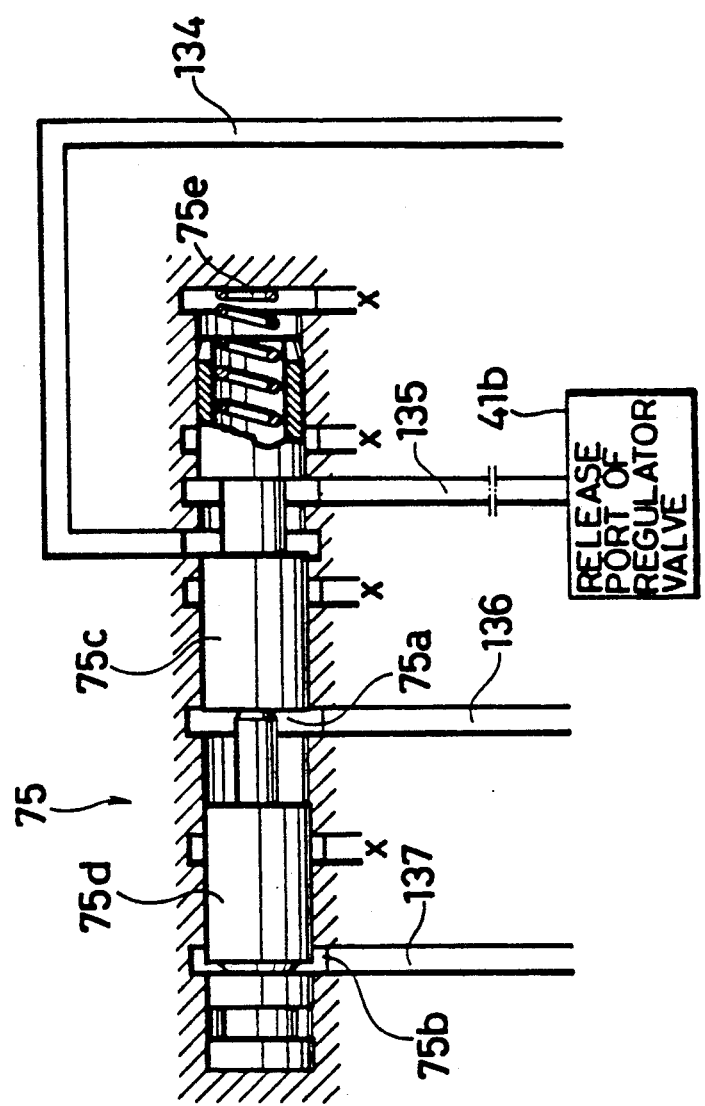

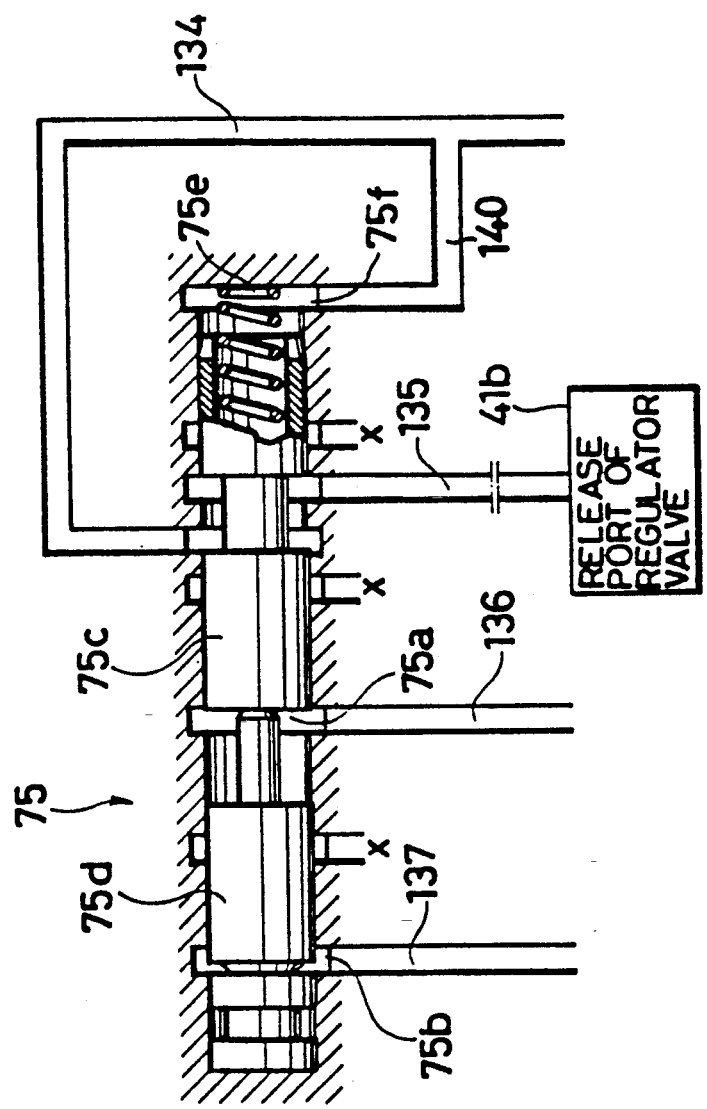

AUTOMATIC TRANSMISSION

BACKGROUND OF THE INVENTION AND RELATED ART STATEMENT

This invention relates to an automatic transmission, particularly to a line pressure control device provided with a hydraulic control circuit having cutback means.

Generally, an automatic transmission includes a torque converter, a transmission gear mechanism having a planetary gear unit and friction coupling members for shifting the gear ratio, and a hydraulic control circuit for controlling hydraulic pressure to the respective friction coupling members. The friction coupling members are clutches, brakes, and the like. The hydraulic control circuit includes pressure regulator means for regulating the hydraulic oil supplied from an oil pump to an appropriate line pressure, and shift valves for controlling the feeding and releasing of coupling pressure to the respective friction coupling members. In such an automatic transmission, the line pressure has been required to control in accordance with change of transmitted torque in order to develop a coupling pressure suitable to transmit the torque, and assure a reduced driving loss of the oil pump and the like.

In view thereof, there has been proposed an automatic transmission provided with a hydraulic control circuit having cutback means. In such an automatic transmission, in addition to usual control of controlling the line pressure in accordance with the throttle opening of the engine, the so-called cutback control is executed in a particular gear ratio. In the cutback control, specifically, the line pressure is reduced when the transmission is set in the particular gear ratio. For example, Japanese Examined Patent Publication No. 46-33050 discloses an automatic transmission having a control valve responsive to hydraulic pressures in shifted gear ratios for reducing the line pressure stepwise as the transmission is progressively set in higher speed gear ratios, in other words, the control valve is adopted for executing cutback control.

In the above-mentioned automatic transmission, when the transmission is set in a low speed gear ratio to transmit a great torque, the cutback control is not executed to maintain a high line pressure to develop a necessary coupling pressure. When the transmission is set in a high speed gear ratio to transmit a small torque, the cutback control is executed to give a reduced driving loss to the oil pump.

There has generally been known an automatic transmission having a coast clutch in its transmission mechanism which enables engine brake. Similarly to other friction coupling members, the coast clutch is locked and released by a hydraulic control circuit. In respect of a particular gear ratio, e.g., second gear ratio, the coast clutch is released in a usual running range, e.g., D range and is locked in an engine brake enable range, e.g., 2 and 1 ranges.

In the automatic transmission in which even in the same gear ratio, the coast clutch can be locked or released in accordance with a selected range, friction coupling members are to slip when the vehicle is decelerated by carrying out the engine brake in the particular gear ratio in the engine brake enable range. Accordingly, it will be seen that the cutback control is necessary to be suspended not only when in low speed gear ratios but also when in the particular gear ratio in the engine brake range.

To fulfill the above-mentioned necessity, that is, to control the execution of cutback not only in accordance with gear ratios but also in accordance with ranges, conventional automatic transmissions are provided with very complicated hydraulic control circuits.

SUMMARY OF THE INVENTION

In view of the above mentioned drawbacks, it is an object of the present invention to provide an automatic transmission which makes it possible to control execution of cutback for a coupling line pressure with a simple construction.

Accordingly, an automatic transmission of the present invention comprises a transmission mechanism and a hydraulic control circuit, the transmission mechanism including a friction coupling member for enabling engine brake and operable to provide a usual running range having a gear ratio and an engine brake enable range having at least the same gear ratio as the usual running range, the usual running range being unable to execute the engine brake in the gear ratio, the engine brake enable range being able to execute the engine brake in the gear ratio, the hydraulic control circuit including hydraulic pressure means for feeding a coupling pressure to the friction coupling member, shift valve means for shifting from a lower speed gear ratio to a higher speed gear ratio, shift valve control means for feeding a shift control pressure to the shift valve means to control the shifting, cutback means changeable into one of a cutback execution state of allowing the coupling pressure to reduce and a cutback suspension state of allowing the coupling pressure not to reduce, and cutback control means for feeding the shift control pressure and the coupling pressure to the cutback means so as to change into the cutback suspension state when the transmission is set in the gear ratio in the engine brake enable range.

According to the above construction, the cutback control is suspended when the transmission is set in the gear ratio in the engine brake enable range, so that the coupling pressure is maintained at a high value. In higher gear ratios which do not require so high coupling pressure, the cutback is executed to reduce the coupling pressure, which consequently assures a reduced driving loss of the oil pump.

Also, the cutback means is actuated by the use of the coupling pressure and the shift control pressure, which thus assures a simplified construction.

This and other objects, features and advantages of the present invention will become more apparent upon a reading of the following detailed description and drawings.

BRIEF DESCRIPTION OF THE INVENTION

FIGS. 2A, 2B are schematic diagrams combinedly showing a hydraulic control circuit provided in the automatic transmission;

FIG. 4 is a diagram showing a specific construction of cutback means; and

FIG. 5 is a diagram showing a specific construction of another cutback means.

DETAILED DESCRIPTION OF PREFERRED EMBODIMENTS OF THE INVENTION

A preferred embodiment of the present invention will be described with reference to the drawings.

Figure 1:
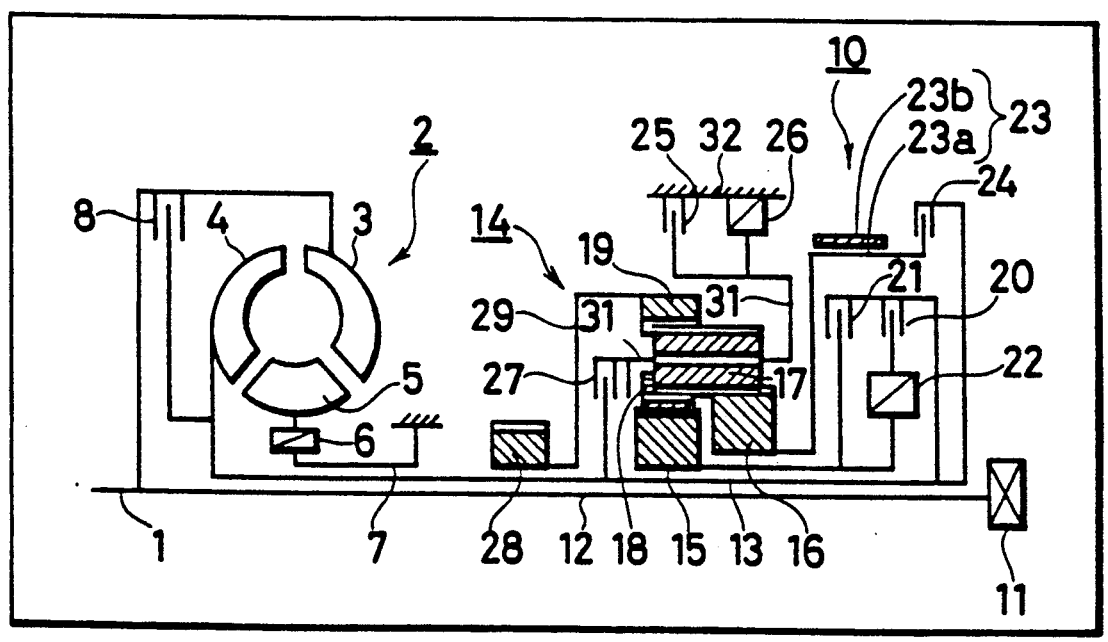
FIG. 1 is a schematic diagram showing an overall construction of an automatic transmission embodying the present invention.

FIG. 1 shows an overall construction of an automatic transmission embodying the present invention. In FIG. 1, indicated at 2 is a torque converter connected to a crankshaft 1 of an engine, and indicated at 10 is a transmission gear mechanism disposed in an output side of the torque converter 2. The torque converter 2 includes a pump 3, a turbine 4, and a stator 5. The pump 3 is fixedly connected to the crankshaft 1. The turbine 4 is fixedly connected to a turbine shaft 13. The stator 5 is connected to a stationary shaft 7 by way of a one-way clutch 6. The stationary shaft 7 is integrally attached to a casing of the torque converter 2. Also, in the torque converter 2 is provided a lockup clutch 8 for directly connecting the crankshaft 1 and the turbine shaft 13.

The transmission gear mechanism 10 includes a central shaft 12 for driving an oil pump 11. The central shaft 12 is connected to the crankshaft 1 at one end thereof, and to the oil pump 11 at the other end. The turbine shaft 13, which is connected to the turbine 4 of the torque converter 2 at one end thereof, is in the form of a hollow cylinder. The central shaft 12 is placed in the turbine shaft 13. A planetary gear unit 14 is mounted on the turbine shaft 13. The planetary gear unit 14 includes a small sun gear 15, a large sun gear 16, a long planetary pinion 17, short planetary pinions 18, and a ring gear 19. Further, friction coupling members are provided in the planetary gear unit 14 as follows.

A forward clutch 20 and a coast clutch 21 are disposed in parallel in the side of the planetary gear unit 14 which is remoter from the crankshaft 1. Between the forward clutch 20 and the small sun gear 15 is provided a first one-way clutch 22. The forward clutch 20 is adopted for connecting and disconnecting the turbine shaft 13 to and from the small sun gear 15 by way of the one-way clutch 22. The coast clutch 21 is adopted for connecting and disconnecting the turbine shaft 13 to and from the small sun gear 15. Accordingly, it will be seen that when the coast clutch 21 is locked, a reverse torque can be transmitted from the wheel to the engine, so that engine brake is enable.

A 2-4 brake 23 is disposed on an outside of the coast clutch 21. The 2-4 brake 23 includes a brake drum 23a connected to the large sun gear 16 and a brake band 23b wrapped around the brake drum 23a. When the 2-4 brake 23 is locked, the large sun gear 16 is held in a stationary position. A reverse clutch 24 is provided in a side of the 2-4 brake 23 and at a position between the turbine shaft 13 and the large sun gear 16 to connect and disconnect the turbine shaft 13 to and from the large sun gear 16. A low and reverse brake 25 is provided between a carrier 31 of the planetary gear unit 14 and a casing 32 of the tranmission gear mechanism 10 to connect and disconnect the carrier 31 to and from the casing 32. Also, a second one-way clutch 26 is provided between the carrier 31 and the casing 32 in parallel to the low and reverse brake 25.

A 3-4 clutch 27 is disposed in the other side of the planetary gear unit 14 which is nearer the crankshaft 1. The 3-4 clutch 27 is adopted for connecting and disconnecting the carrier 31 to and from the turbine shaft 13. An output gear 28 is disposed in a side of the 3-4 clutch 27, and connected to the ring gear 19 by way of an output shaft 29.

The transmission gear mechanism 10 has four forward gear ratios and one reverse gear ratio. A desired gear ratio is obtained by actuating the clutches 20, 21, 24, 27 and the brakes 23, 25 in a predetermined pattern. Table 1 shows a relationship between gear ratios and actuations of the clutches and brakes.

TABLE 1

| RANGE | CLUTCH REVERSE (24) | CLUTCH FORWARD (20) | CLUTCH COAST (21) | CLUTCH 3-4 (27) | BRAKE LOW REVERSE (25) | BRAKE 2-4 (23) | ONE-WAY CLUTCH 2-nd (26) | ONE-WAY CLUTCH 1-st (22) |
|---|---|---|---|---|---|---|---|---|
| P | | | | | | | | |
| R | O | | | | O | | | |
| N | | | | | | | | |
| D 1st | | O | | | | | O* | O* |
| 2nd | | O | | | | O | | O* |
| 3rd | | O | O | O | | | | O* |
| 4th | | O | | O | | O | | |
| 2 1st | | O | | | | | O* | O* |
| 2nd | | O | | | | O | | O* |
| 3rd | | O | O | O | | | | O* |
| 1 1st | | O | | | O | | | O* |
| 2nd | | O | | | | O | | O* |

*idle during coasting

Figure 2A:
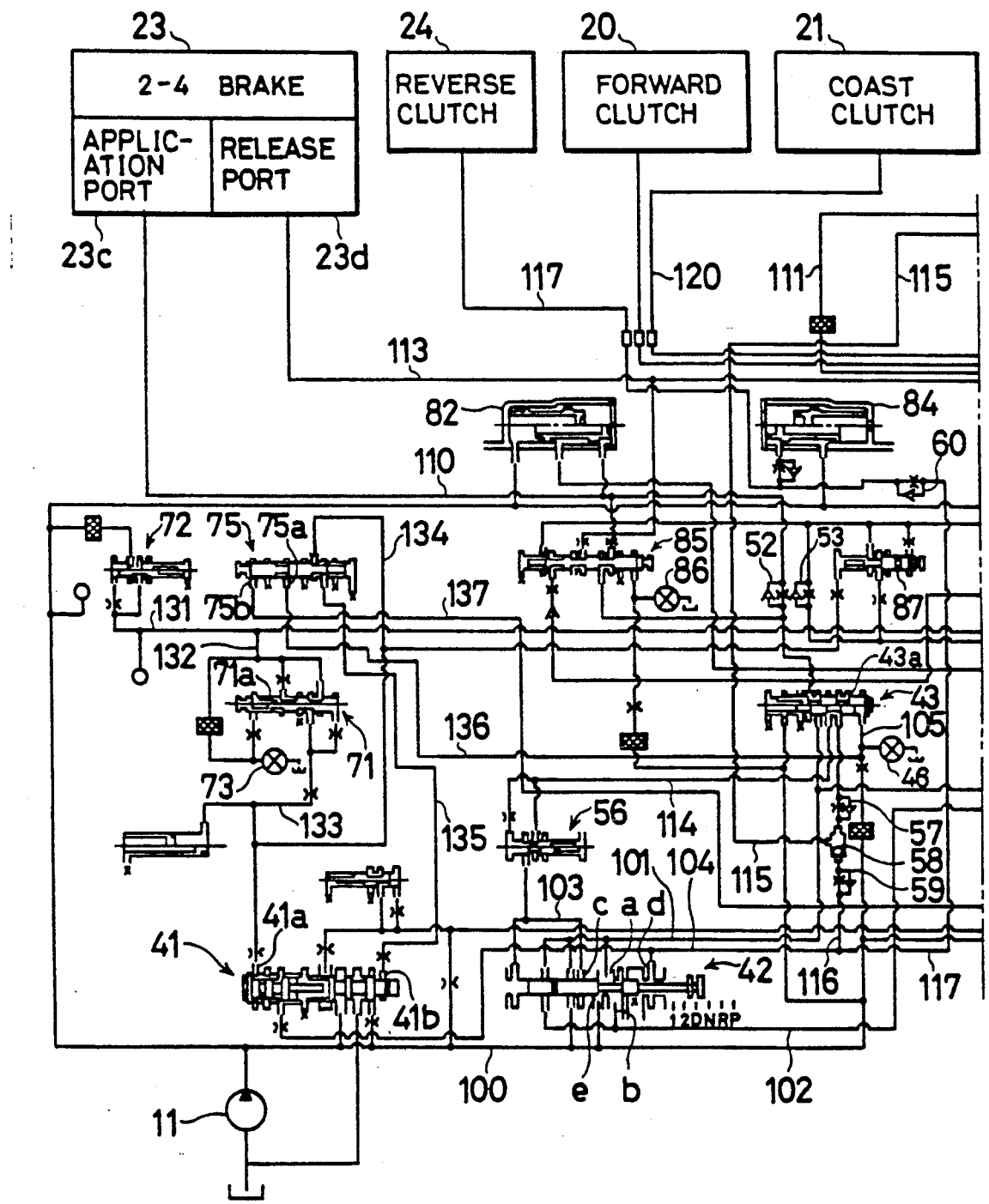

FIG. 2 shows a hydraulic control circuit 40 for feeding and releasing hydraulic pressure to and from actuators of the clutches 20, 21, 24, 27 and the brakes 23, 25. A hydraulic pressure actuator of the 2-4 brake 23 is a servo piston having an application port 23c and a release port 23d. When the hydraulic pressure is applied to only the application port 23c, the 2-4 brake 23 is locked. When the hydraulic pressure is applied to neither or both of the ports 23c and 23d, the 2-4 brake 23 is released. The actuators of the other friction coupling members 20, 21, 24, 25, 27 are usual hydraulic pistons. When the hydraulic pressure is applied, the friction coupling members are locked.

The hydraulic control circuit 40 has a pressure regulator valve 41, a manual valve 42, 1-2 shift valve 43, 2-3 shift valve 44, and 3-4 shift valve 45. The pressure regulator valve 41 is adopted for regulating the pressure of hydraulic oil discharged from the oil pump 11 to a main line 100 to an appropriate line pressure. The manual valve 42 is actuated by hand and adopted for selecting a range manually. The 1-2 shift valve 43, 2-3 shift valve 44 and 3-4 shift valve 45 are adopted for feeding and releasing the hydraulic pressure to and from the clutches 20, 21, 24, 27 and the brakes 23, 25. In addition, the hydraulic control circuit 40 is provided with a modulator valve 71 and a cutback valve 75 for controlling the pressure regulator valve 41.

The manual valve 42 has an input port e through which the line pressure is fed from the main line 100, and first to fourth output ports a to d. The manual valve 42 is manually shifted into one of P, R, N, D, 2 and 1ranges. When D range or 2 range is selected, the input port e is communicated with the first and second output ports a and b. When 1 range is selected, the input port e is communicated with the first and third output ports a and c. When R range is selected, the input port e is communicated with the fourth output port d. First to fourth output lines 101 to 104 are respectively connected to the output ports a to d.

The shift valves 43, 44 and 45 have spools 43a, 44a and 45a which are urged rightward by springs (not shown). The spools 43a, 44a and 45a are actuated according to pilot pressures which are controlled by the solenoid valves 46, 47 and 48. Specifically, the 1-2 solenoid valve 46 is connected to a pilot line 105 which is led from the main line 100 and connected to a pilot port of the 1-2 shift valve 43. The 2-3 solenoid valve 47 and the 3-4 solenoid valve 48 are respectively connected to pilot lines 107 and 108. The pilot lines 107 and 108 branching off from a line 106 led from the first output line 101 are respectively connected to pilot ports of the 2-3 shift valve 44 and the 3-4 shift valve 45. When being turned on, the solenoid valves 46, 47, and 48 respectively remove the pilot pressures to permit the spools 43a, 44a, and 45a to slide rightward. When the solenoid valves 46, 47, and 48 are turned off, the pilot pressures are applied to the pilot ports to hold the spools 43a, 44a, and 45a in the respective left positions.

The solenoid valves 46, 47, and 48 are turned on and off in accordance with control signals sent from a control unit (not shown) on the basis of a map which has been prepared and stored in the control unit according to the range and the vehicle speed, and the throttle opening of the engine. In response to the turning on and off of the solenoid valves 46, 47, and 48, the spools 43a, 44a, and 45a of the shift valves 43, 44, and 45 are slid, the hydraulic passages leading to the 2-4 brake 23, the 3-4 clutch 27, the coast clutch 21 and other parts being consequently changed so that the coupling pressure to the friction coupling members is applied or released as patterns shown in Table 1. Combination patterns of turning on and off of the solenoid valves 46, 47, and 48, or solenoid patterns are shown in Table 2. The combination patterns show ON-OFF states of the respective solenoid valves 46, 47, and 48 in each gear ratio in D, 2, and 1 ranges.

The first output line 101 is led to the 1-2 shift valve 43. When the 1-2 solenoid valve 46 is turned on, the first output line 101 is brought into communication with a servo application line 110. The servo application line 110 is led to the application port 23c of the actuator of the 2-4 brake 23 by way of a one-way orifice 52. When the hydraulic pressure is fed to the application port 23c and is not fed to the release port 23d, the 2-4 brake 23 is locked.

The second output line 102 is made to communicate with the main line 100 when one of D and 2 ranges is selected. The second output line 102 is led to the 2-3 shift valve 44. The second output line 102 is brought into communication with a 3-4 clutch line 111 when the 2-3 solenoid valve 47 is turned off. The 3-4 clutch line 111 is led to the 3-4 clutch 27 by way of a one-way orifice 53. Accordingly, when one of D and 2 ranges is selected and the 2-3 solenoid valve 47 is turned off, the 3-4 clutch 27 is locked.

When the second output line 102 is connected to the 3-4 clutch line 111 and the 2-3 solenoid valve 47 is turned off, a line 112 which is communicated with the second output line 102 is led to the 3-4 shift valve 45. When the 3-4 solenoid valve 48 is turned off, the line 112 is communicated with a servo release line 113. The servo release line 113 is led to a release port 23d of the actuator of the 2-4 brake 23 by way of a 2-3 timing valve 54, a one-way orifice 55 and other parts. Accordingly, when one of D and 2 ranges is selected and the 2-3 solenoid valve 47 and the 3-4 solenoid valve 48 are turned off, the hydraulic pressure is fed to the release port 23d of the 2-4 brake 23, so that the 2-4 brake 23 is released. When the 1-2 solenoid valve 46 is turned on and at least one of the 2-3 solenoid valve 47 and the 3-4 solenoid valve 48 is turned on, in other words, the hydraulic pressure is fed to the application port 23c, the 2-4 brake 23 is locked.

The third output line 103 is made to communicate with the main line 100 when 1 range is selected. The third output line 103 is led to the 1-2 shift valve 43 by way of a low reducing valve 56 and a line 114. When the 1-2 solenoid valve 46 is turned off, the line 114 is brought into communication with a low reverse brake line 115 by way of a one-way orifice 57 and a ball valve 58 and then led to a low reverse brake 25. Accordingly, when 1 range is selected and the 1-2 solenoid valve 46 is turned off, the low reverse brake 25 is locked.

The fourth output line 104 is made to communicate with the main line 100 when R range is selected. The

TABLE 2

| GEAR RATIO | RANGE | | | | | | | | |
|---|---|---|---|---|---|---|---|---|---|
| | D | | | | 2 | | | 1 | |
| | 1st | 2nd | 3rd | 4th | 1st | 2nd | 3rd | 1st | 2nd |
| 1-2 SOLENOID VALVE (46) | OFF | ON | ON | ON | OFF | ON | ON | OFF | ON |
| 2-3 SOLENOID VALVE (47) | ON | ON | OFF | OFF | ON | ON | OFF | ON | ON |
| 3-4 SOLENOID VALVE (48) | ON | ON | OFF | ON | ON | OFF | OFF | OFF | OFF |

The line 106 branches off from the first output line 101 which is made to communicate with the main line 100 when one of D, 2 and 1 ranges is selected. The line 106 is led to the forward clutch 20 by way of a one-way orifice 51. Accordingly, the forward clutch 20 is held in the lock position when one of D, 2 and 1 ranges is selected.

fourth output line 104 is brought into communication with the low reverse brake line 115 by way of a line 116 branching off from the fourth output line 104, a one-way orifice 59, and the ball valve 58. Also, the fourth output line 104 is brought into communication with a reverse clutch line 117 and then led to a reverse clutch 24 by way of a one-way orifice 60. Accordingly, when R range is selected, the low reverse brake 25 and the reverse clutch 24 are held in their lock positions.

Further, the hydraulic pressure is fed to the coast clutch 21 as follows. One of lines 121 and 122 is selectively communicated with a coast clutch line 120 by way of a ball valve 61 and one-way orifices 62, 63. The coast clutch line 102 is led to the coast clutch 21. The line 121 branches off from the servo release line 113. The line 122 is led from the 2-3 shift valve 44. A hydraulic pressure is fed to the line 122 by way of a line 123 and a line 124. The line 123 branches off from the forward clutch line 106 and then is led to the 3-4 shift valve 45. The line 124 is led from the 3-4 shift valve 45 to the 2-3 shift valve 44. When the 3-4 solenoid valve 48 is turned off, the line 123 is brought into communication with the line 124. When the 2-3 solenoid valve 47 is turned on, the line 124 is brought into communication with the line 122.

Accordingly, when both the 2-3 solenoid valve 47 and the 3-4 solenoid valve 48 are turned off in third of D range and third of 2 range in which the hydraulic pressure is applied to the servo release line 113, the coast clutch 21 is locked by the hydraulic pressure fed to the coast clutch line 120 by way of the line 121. When the 2-3 solenoid valve 47 is turned on and the 3-4 solenoid valve 48 is turned off in second of 2 range, and first and second of 1 range, the coast clutch 21 is locked by the hydraulic pressure fed to the coast clutch line 121 by way of the line 122.

The hydraulic pressure feeding system for the coast clutch 21 causes the coast clutch 21 to be released in second of D range which is a usual running range and to be locked in second of 2 and 1 ranges which are engine brake enable ranges.

The line pressure is controlled as follows. The modulator valve 71 is connected to a line 132. The line 132 branches off from a line 131 which is communicated with the main line 100 by way of a solenoid reducing valve 72. A pilot pressure developed by a duty solenoid valve 73 is fed to one end of a spool 71a of the modulator valve 71 so that a modulator pressure is developed according to a duty cycle of the duty solenoid valve 73. The duty cycle of the duty solenoid valve 73 is changed according to the throttle opening of the engine. The modulator pressure corresponding to the duty cycle is fed to a booster port 41a of the pressure regulator valve 41 by way of a modulator line 133. Accordingly, the line pressure is changed in accordance with the throttle opening of the engine.

On the other hand, a line 134 branching off from the modulator line 133 is led to the cutback valve 75. A cutback line 135 is led from the cutback valve 75 and then connected to a pressure reduction port 41b of the pressure regulator valve 41. The cutback line 135 is brought into communication with or shut off from the line 134 according to actuation of the cutback valve 75. When the cutback line 135 is communicated with the line 134, the modulator pressure is applied to the pressure reduction port 41b of the pressure regulator valve 41 so that the line pressure is reduced, i.e., the cutback control is executed. When the cutback line 135 is shut off from the line 134, but be communicated with a drain port, the cutback control is not executed.

Lines 136 and 137 are provided as control pressure feed passages for feeding the control pressure to the cutback valve 75. The line 136 branches off from a pilot line 105 led to the 1-2 shift valve 43. The line 137 branches off from a line 122 between the 2-3 shift valve 44 and the coast clutch line 120. The pilot pressure which is applied to the 1-2 shift valve 43 when the 1-2 solenoid valve 46 is turned off is fed to a first pilot port 75a of the cutback valve 75 by way of the line 136. In addition, the hydraulic pressure which is fed from the 2-3 shift valve 44 to the coast clutch line 120 by way of the line 122 in second of 2 and 1 ranges is applied to a second pilot port 75b of the cutback valve 75 by way of the line 137.

Further, the hydraulic control circuit includes accumulators 81, 82, 83, and 84, a timing valve 85, a bypass valve 87, and a coast control valve 88. The accumulators 81, 82, 83, and 84 are led to the forward clutch 20, 2-4 brake 23, 3-4 clutch 27 and reverse clutch 24 to reduce shocks which occur when actuating them. The timing valve 85 is adopted for controlling the timing of feeding and releasing of the hydraulic pressure during each gear shifting. The timing valve 85 is controlled by a solenoid valve 86. The bypass valve 87 is provided in a line which bypasses the one-way orifice 53 of the 3-4 clutch line 111 for and adopted for adjusting the timing of the hydraulic pressure to the 3-4 clutch. The coast control valve 88 is provided in the line 121 which branches off from the servo release line 113 and adopted for adjusting the timing of the hydraulic pressure to the coast clutch 21. Moreover, the hydraulic control circuit 40 includes a lockup shift valve 89, a lockup control valve 90, a lockup solenoid valve 91, a duty solenoid valve 92 to control the lockup clutch 8.

Figure 3:
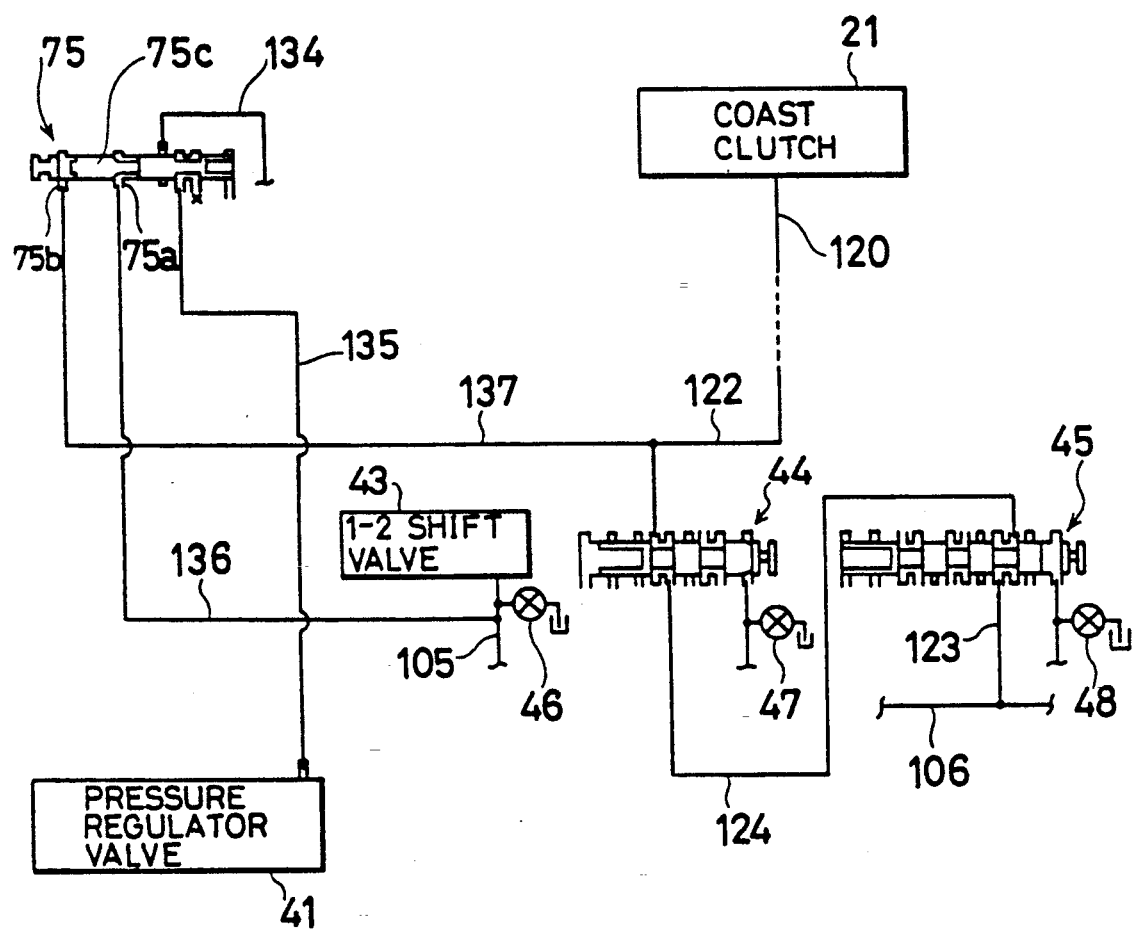
FIG. 3 is a schematic diagram showing a cutback control circuit provided in the hydraulic control circuit.

FIG. 3 shows cutback means provided in the hydraulic control circuit and a control system for the cutback means. FIG. 4 shows a specific construction of the cutback means. As shown in FIGS. 3 and 4, the cutback valve 75 includes a right spool member 75c and a left spool member 75d which are arranged in series. The right and left spool members 75c and 75d are urged leftward by a spring 75e. A first pilot port 75a is provided between the right and left spool members 75c and 75d. A second pilot port 75b is provided to the left end of the spool. When the pilot pressure of the pilot line 105 led to the 1-2 shift valve 43 is fed to the first pilot port 75a by way of the line 136, the right spool member 75c is moved rightward. When the hydraulic pressure of the line 122 led to the coast clutch 21 is fed to the second pilot port 75b by way of the line 137, the both spool members 75c and 75d are moved rightward. In these times, the cutback line 135 is communicated with the drain port, so that the cutback control is suspended. When the hydraulic pressure is fed to neither of the pilot ports 75a and 75b, the both spool members 75c and 75d are moved leftward by the force of the spring 75e. Consequently, the cutback line 135 is communicated with the line 134, so that the cutback control is executed.

In other words, the cutback control is suspended at least in one of the case that the 1-2 solenoid valve 46 is turned off and the pilot pressure is consequently fed to the pilot line 105, and the case that the 2-3 solenoid valve 47 is turned on and the 3-4 solenoid valve 48 is turned off and the hydraulic pressure is consequently fed to the line 122 led to the coast clutch 21. The cutback control is executed in other cases. Table 3 shows the execution and suspension states of the cutback control in accordance with combinations of turning on and off of the solenoid valves in the respective gear ratios of D, 2 and 1 ranges.

TABLE 3

| GEAR RATIO | RANGE D |  |  |  | 2 |  |  | 1 |  |
|---|---|---|---|---|---|---|---|---|---|
|  | 1st | 2nd | 3rd | 4th | 1st | 2nd | 3rd | 1st | 2nd |
| 1-2 SOLENOID VALVE (46) | OFF | ON | ON | ON | OFF | ON | ON | OFF | ON |
| 2-3 SOLENOID VALVE (47) | ON | ON | OFF | OFF | ON | ON | OFF | ON | ON |
| 3-4 SOLENOID VALVE (48) | ON | ON | OFF | ON | ON | OFF | OFF | OFF | OFF |
| CUTBACK VALVE | OFF | ON | ON | ON | OFF | OFF | ON | OFF | OFF |

According to this embodiment, in first of D range, i.e., usual running range, and in first of 2 and 1 ranges, i.e., engine brake enable range, the 1-2 solenoid valve 46 for controlling the 1-2 shift valve 43 is turned off. Consequently, the pilot pressure for the 1-2 shift valve 43 is fed to the first pilot port 75a of the cutback valve 75, so that the cutback control is suspended. Accordingly, the high line pressure is maintained which assures the necessary coupling pressure for first gear ratio.

Also, in second of 2 and 1 ranges, the 2-3 solenoid valve 47 is turned on and the 3-4 solenoid valve 48 is turned off. Consequently, the hydraulic pressure is fed to the coast clutch 21 by way of the line 122 and is fed to the second pilot port 75b of the cutback valve 75, so that the cutback control is suspended. Accordingly, the high line pressure is maintained to assure the necessary coupling pressure for second of 2 and 1 ranges.

In second of 2 and 1 ranges, specifically, the 2-4 brake 23 including the band brake is locked and the coast clutch 21 is locked. Accordingly, the 2-4 brake 23 receives a reverse torque when decelerating the vehicle. In other words, the engine brake is executed. It will be seen that a comparatively high line pressure is required to assure a sufficient coupling pressure for the 2-4 brake against the reverse torque. This requirement is fulfilled by suspending the cutback control.

In the other cases, i.e., in second of D range, third and fourth of D, 2, and 1 ranges, the cutback valve 75 is put into execution, so that the line pressure is appropriately reduced.

As mentioned above, the cutback valve 75 is controlled in accordance with the range and gear ratio. Specifically, the hydraulic control circuit, particularly the lines 136 and 137, is constructed so that the pilot pressure for the 1-2 shift valve 43 and the hydraulic pressure fed to the coast clutch 21 by way of the line 122 serve as control pressure for the cutback valve 75. Accordingly, it will be seen that the cutback valve 75 is controlled with a simple construction.

In the above embodiment, only the spring 75e develops the opposite force against the control pressure fed to the pilot ports 75a and 75b of the cutback valve 75. However, there is a likelihood that a response delay occurs due to a residual pressure when the cutback valve 75 is changed to the execution state by releasing the control pressure. Accordingly, it is preferable to provide restoration prompter means for feeding an additional opposite hydraulic pressure against the control pressure to eliminate the response delay.

FIG. 5 shows a specific construction of another cutback means having restoration prompter means. As mentioned above, the line 134 and the cutback line 135 are led to the cutback valve 75. The line 134 branches off from the modulator line 133. The cutback line 135 is led to the release port 41b of the pressure regulator valve 41. Movement of the right spool member 75c and the left spool member 75d brings the line 134 into communication or incommunication with the line 135, so that the modulator pressure is fed or released to or from the release port 41b of the pressure regulator valve 41. To move the right spool member 75c and the left spool member 75d, the pilot pressure of the pilot line 105 led to the 1-2 shift valve 43 is fed to the first port 75a by way of the line 136, the hydraulic pressure of the line 122 led to the coast clutch 21 is fed to the second port 75b by way of the line 137.

In addition, a modulator pressure port 75f is provided in a right end of the cutback valve 75 so as to feed the modulator pressure to oppose to the pilot pressure and the like at all times by way of a line 140 branching off from the line 134. The modulator pressure port 75f and the line 140 constitutes the restoration prompter means.

When the pilot pressure is fed to the first pilot port 75a, i.e., in first of D, 2 and 1 ranges in which the 1-2 solenoid valve 46, the pilot pressure overcomes a biasing force of the modulator pressure of the modulator pressure port 75f and the force of the spring 75e, so that the right spool member 75c is moved rightward. Consequently, the lines 134 is brought into incommunication with the line 135.

Also, when the hydraulic pressure is fed to the second port 75b in second of 2 range, and first and second of 1 range, the hydraulic pressure overcomes the biasing force of the modulator pressure and the force of the spring 75e, so that the both spool members 75c and 75d are moved rightward. Consequently, the line 134 is brought into incommunication with the line 135. Accordingly, the cutback control is suspended in first of D range, first and second of 2 range, and first and second of 1 range.

In second, third and fourth of D range, and third of 2 range, on the other hand, the pilot pressure and the hydraulic pressure are not fed to the first and second pilot ports 75a and 75b of the cutback valve 75, so that the both spool members 75c and 75d are moved leftward by the biasing force of the modulator pressure at the modulator pressure port 75f and the force of the spring 75e. Consequently, the line 134 is brought into communication with the line 135, and the cutback control is executed.

When shifting the gear ratio from first to second in D range, the 1-2 solenoid valve 46 is turned on, the pilot pressure of the first pilot port 75a being released, the right spool member 75c being then moved leftward. Even when the pilot pressure is not released entirely, the right spool member 75c is restored to the original position when the pilot pressure becomes smaller than the biasing force of the modulator pressure and the force of the spring 75e. Consequently, the line 134 is brought into communication with the line 135.

Accordingly, it will be seen that the right spool member 75c can be restored to the original position rapidly even in the following cases. One is that the viscosity of hydraulic oil becomes high due to low temperature, which causes the releasing of the pilot pressure from the 1-2 solenoid valve 43 to delay. Another is that the line pressure becomes high due to high load on the engine, the pilot pressure consequently becomes high, which causes the liability of producing undesirable residual pressure in the first port 75a of the cutback valve 75. Also, when the pilot pressure is high, the modulator pressure is high. Accordingly, the right spool member 75c is moved with a high reliability. Thus, the cutback control can be executed with a high responsiveness, and smooth shifting can be obtained.

As described above, an automatic transmission of the present invention includes a coast clutch for enabling engine brake and cutback means. In a particular gear ratio of a usual running range, the coast clutch is released. In a particular gear ratio of an engine brake enable range, the coast clutch is locked. When the transmission is set in a low speed gear ratio to transmit a great torque, and in a particular gear ratio of the engine brake enable range, the cutback is released. In other words, the cutback control is optimally executed in accordance with change of transmitted torque and possibility of engine brake. Further, the cutback means is controlled by use of a pilot control pressure to a low speed shift valve and a hydraulic pressure fed to the coast clutch in the particular gear ratio of the engine brake enable range. Accordingly, the cutback means can be properly controlled by a hydraulic oil line for feeding the pilot pressure and the hydraulic pressure to the cutback means, which is simple in construction.

Also, an automatic transmission of the present invention includes restoration prompter means for restoring cutback means to an original position in a short time. Accordingly, when the cutback means is changed from suspension state to execution state by releasing control pressure from the cutback means, the cutback means can be restored to the original position before the control pressure is entirely released. Also, as the engine receives greater load, the cutback means restores to the original position more rapidly. Thus, the cutback means can be restored to the original position with high responsiveness and reliability, even if the hydraulic oil has high viscosity, or the line pressure becomes high.

Although the present invention has been fully described by way of example with reference to the accompanying drawings, it is to be understood that various changes and modifications will be apparent to those skilled in the art. Therefore, unless otherwise such changes and modifications depart from the scope of the invention, they should be construed as being included therein.

What is claimed is:

1. An automatic transmission comprising:

a transmission mechanism; and
   a hydraulic control circuit;
   the transmission mechanism including a friction coupling member for enabling engine brake and being operable to provide a usual running range having a gear ratio and an engine brake enable range having at least the same gear ratio as the usual running range, the usual running range being unable to execute the engine brake in the gear ratio, the engine brake enable range being able to execute the engine brake in the gear ratio;
   the hydraulic control circuit including:
   hydraulic pressure means for feeding a coupling pressure to the friction coupling member;
   shift valve means for shifting from a lower speed gear ratio to a higher speed gear ratio;
   shift valve control means for feeding a shift control pressure to the shift valve means to control the shifting;
   cutback means changeable into one of a cutback execution state of allowing the coupling pressure to reduce and a cutback suspension state of allowing the coupling pressure not to reduce;
   cutback control means for feeding the shift control pressure and the coupling pressure to the cutback means so as to change to the cutback suspension state when the transmission is set in the gear ratio in the engine brake enable range.

2. An automatic transmission according to claim 1 wherein the hydraulic control circuit further includes restoration prompter means for restoring the cutback means to the cutback execution state from the cutback suspension state in a shorter time.

3. An automatic transmission according to claim 2 wherein the hydraulic control circuit further includes a modulator valve means for feeding a modulation control pressure to the hydraulic pressure means to modulate the coupling pressure according to engine load, the restoration prompter means feeds the modulation pressure to the cutback means to restore the cutback means to the cutback execution state.

4. An automatic transmission according to claim 1 wherein the cutback means is connectable to the hydraulic pressure means for feeding a cutback control pressure to the hydraulic pressure means to reduce the coupling pressure.

5. An automatic transmission according to claim 4 wherein the cutback means includes a first spool member, a second spool member, a first port responsive to the coupling pressure for actuating the first spool member, a second port responsive to the shift control pressure for actuating the second spool member, whereby one of the first spool member and the second spool member or both spool members being actuated by one of the coupling pressure and the shift control pressure or both pressures so as to suspend the cutback.

* * * * *